United States Patent [19]

Matsumoto

[11] 4,276,862
[45] Jul. 7, 1981

[54] INTERNAL COMBUSTION ENGINE OF FUEL INJECTION TYPE

[75] Inventor: Hiromitsu Matsumoto, Hamamatsu, Japan

[73] Assignee: Yamaha Hatsukoki Kabushiki Kaisha, Iwata, Japan

[21] Appl. No.: 58,253

[22] Filed: Jul. 17, 1979

[30] Foreign Application Priority Data

Jul. 17, 1978 [JP] Japan .................................. 53-87398

[51] Int. Cl.³ .......................... F02B 29/00; F02D 9/08; F02M 51/02
[52] U.S. Cl. ................................. 123/432; 123/52 M; 123/308; 123/442; 123/445
[58] Field of Search ............. 123/32 EA, 52 M, 75 B, 123/119 D, 124 R, 139 AW

[56] References Cited

U.S. PATENT DOCUMENTS

| | | | |
|---|---|---|---|
| 3,690,306 | 9/1972 | Matsui et al. | 123/139 AW X |
| 3,807,367 | 4/1974 | Lamm | 123/442 X |
| 3,827,411 | 8/1974 | Lamm et al. | 123/442 |
| 3,868,936 | 3/1975 | Rivere | 123/445 |
| 4,034,733 | 7/1977 | Noguchi et al. | 123/32 EB X |
| 4,077,363 | 3/1978 | Noguchi et al. | 123/75 B X |
| 4,216,753 | 8/1980 | Inoue et al. | 123/472 X |

FOREIGN PATENT DOCUMENTS 1153559 5/1969 United Kingdom ................ 123/52 M Primary Examiner—Tony M. Argenbright
Attorney, Agent, or Firm—Ernest A. Beutler

[57] ABSTRACT

Several embodiments of fuel injected internal combustion engines having improved injection and induction systems for improving performance, particularly at low speeds. In each embodiment, the injection nozzle is disposed in a position so as to have its discharge spray directed against a throttle valve of the engine so as to improve fuel vaporization at low engine speeds. In each embodiment, an auxiliary induction system is also provided having a relatively small cross sectional area. The idle and low load charge requirements of the engine are supplied through this auxiliary induction system to further improve vaporization and also to promote turbulence in the chamber at the time of combustion. The fuel injection nozzles of the embodiment are disposed so that their discharge spray either intercepts the inlet opening to the auxiliary induction system or is diverted by the throttle valve toward this opening. In one embodiment of the invention, two fuel injection nozzles are employed which discharge alternately.

22 Claims, 6 Drawing Figures

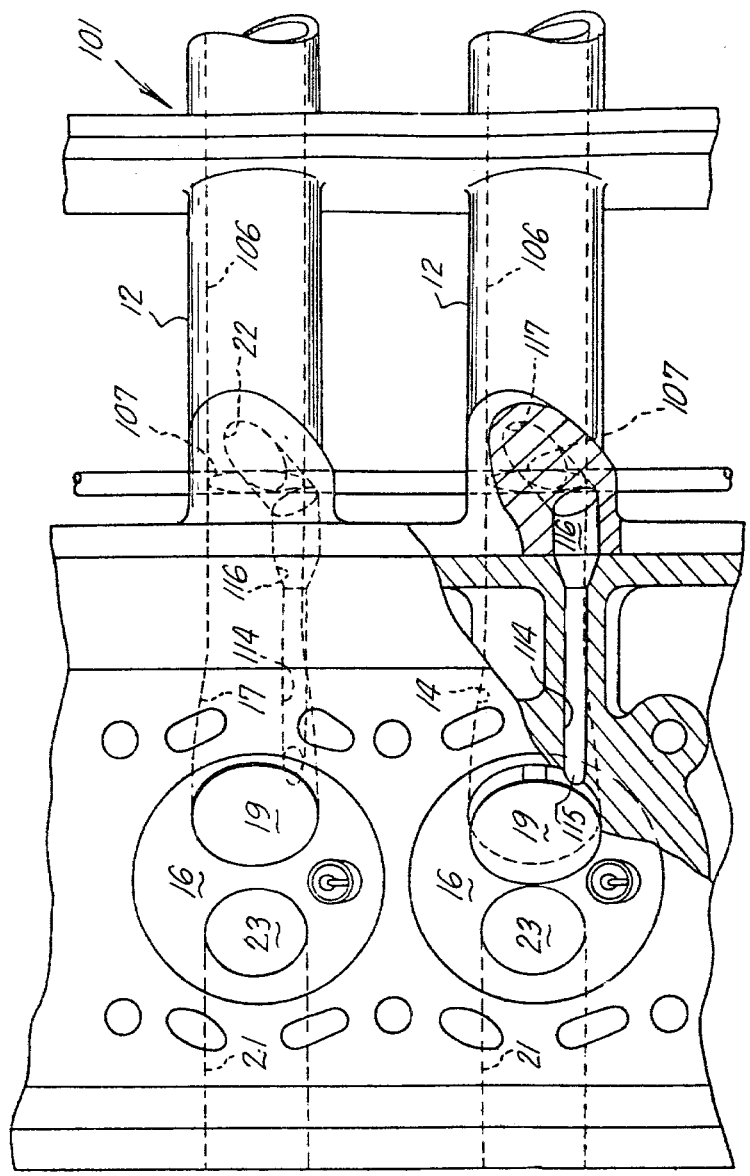

INTERNAL COMBUSTION ENGINE OF FUEL INJECTION TYPE

BACKGROUND OF THE INVENTION

This invention relates to an internal combustion engine of the fuel injection type and more particularly to an improved induction system for such an engine.

It is well known that the idle and low speed running conditions of an internal combustion engine offer the most difficult phase in which to control fuel economy and exhaust emissions. Although fuel injection systems have been proposed as a possible solution to this problem, the systems heretofore known have not completely solved the problems of low speed running. Specifically, the fuel injection nozzle discharges at a relatively high pressure. At low speeds the air is flowing very slowly through the induction system and the likelihood of wetting of the induction system passages is extremely great. Of course, if the liquid fuel impinges on the induction system passages poor running results, which is normally compensated for by providing an over-rich mixture under this condition. In addition to adversely affecting fuel economy, the use of such over-rich mixtures aggravates the problem of exhaust emission control.

It is, therefore, a principal object of this invention to provide an improved fuel injected internal combustion engine that offers significant improvements in performance at low speeds.

It is another object of the invention to provide an induction system for a fuel injected internal combustion engine that minimizes the likelihood of fuel condensation at low speeds.

SUMMARY OF THE INVENTION

A first feature of this invention is adapted to be embodied in an internal combustion engine having a variable volume chamber in which combustion occurs. An internal combustion system is provided for the chamber consisting of a main intake passage and an auxiliary intake passage each of which communicate with the chamber through the respective main and auxiliary intake ports. The auxiliary intake passage has an effective cross sectional area that is substantially less than that of the main intake passage for causing a given mass flow of charge to enter the chamber from the auxiliary intake passage at a significantly greater velocity. Valve means control the ratio of communication of the ports with the chamber during a given cycle of engine operation. The inlet to the auxiliary intake passage is in communication with the main intake passage. In accordance with this feature of the invention, a fuel injection nozzle is provided which discharges into the main intake passage and in a direction toward the auxiliary intake passage inlet.

Another feature of this invention is adapted to be embodied in an engine having main and auxiliary intake passages as set forth in the preceding paragraph. In accordance with this feature of the invention, the valve means which control the ratio of communication of the ports with the chamber includes a butterfly type throttle valve rotatably positioned in one of the intake passages. Also in accordance with this feature of the invention, a fuel injection nozzle discharges into the one induction passage in a direction to impinge upon the butterfly type throttle valve in at least certain positions of such throttle valve.

Another feature of this invention is adapted to be embodied in an induction system for an engine having an induction passage that delivers a charge to a variable volume chamber of the engine. A pair of fuel injection nozzles are incorporated each of which discharge into the induction passage, one upstream of the other. Means alternately cause first one of the nozzles to discharge fuel and then the other of the nozzles to discharge fuel so that the discharge of fuel from the nozzles is not coextensive.

BRIEF DESCRIPTION OF THE DRAWINGS

FIG. 6 is a bottom plan view of the cylinder head and induction system of the embodiment of FIG. 5, with a portion broken away, and is taken generally along the line 6—6 of FIG. 5.

DETAILED DESCRIPTION OF THE PREFERRED EMBODIMENT

Figure 1:
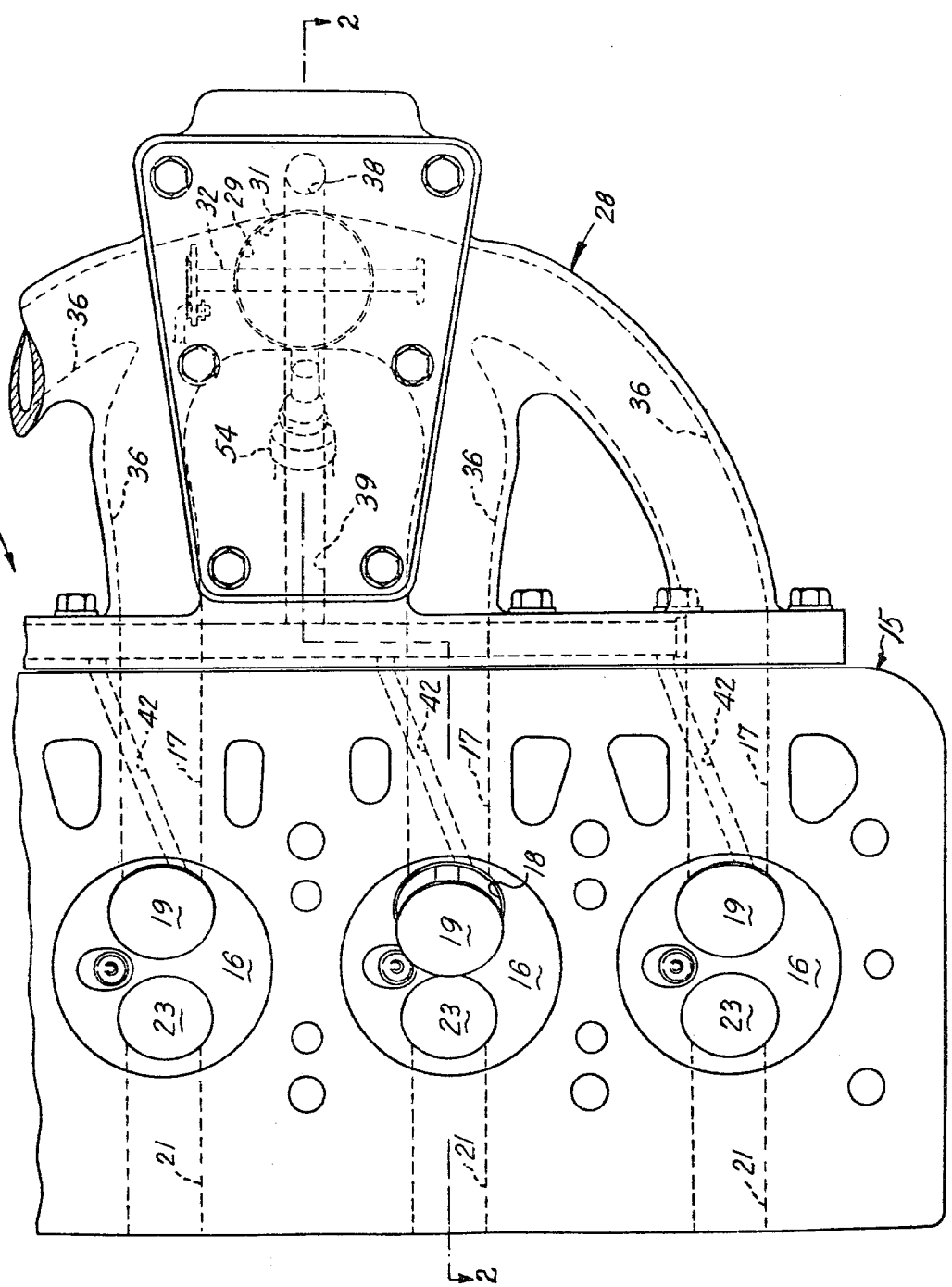
FIG. 1 is a bottom plan view showing the underside of a cylinder head of an induction system of an internal combustion engine embodying this invention and is taken generally along the line 1—1 of FIG. 2.

Before beginning a detailed description of each embodiment of the invention, it is pointed out that the several embodiments have many components which are common with each other. Because of the similarity of certain components of the various embodiments and their similar function, the similar components have only been described in conjunction with the embodiment of FIGS. 1 and 2. Where these components are used in other embodiments, they are identified by the same reference numerals and the description of them is not repeated, except as may be necessary to understand the application of the invention to the particular embodiment in question.

Figure 2:
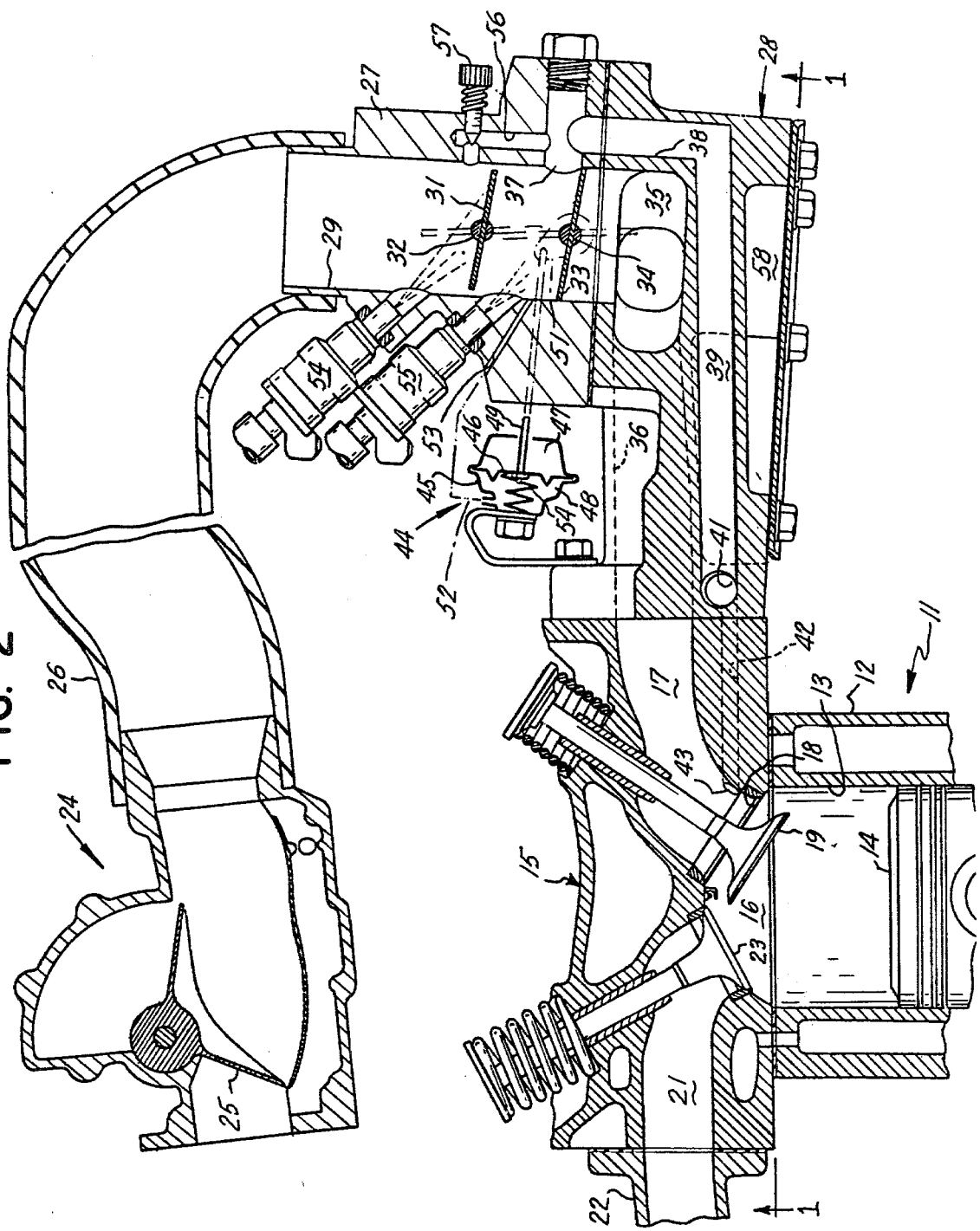
FIG. 2 is a vertical cross sectional view of the embodiment shown in FIG. 1 and is taken generally along the line 2—2 of FIG. 1.

A first embodiment of this invention is shown in FIGS. 1 and 2 and is adapted to be incorporated into an internal combustion engine, indicated generally by the reference numeral 11. The engine 11 in the illustrated embodiment is of the four cylinder in-line type but it is to be understood that the invention is susceptible to the use of other cylinder numbers and configurations as well as with rotary type engines.

The engine 11 includes a cylinder block 12 in which cylinder bores 13 are formed. Pistons 14 are supported for reciprocation within the cylinder bores 13 and are connected in a known manner to the engine output shaft (not shown). A cylinder head, indicated generally by the reference numeral 15 is affixed to the cylinder block 12 and has cavities 16 aligned with each of the cylinder bores 13. The cavities 16, cylinder bores 13 and pistons 14 define chambers of variable volume in which the combustion occurs. These chambers will, at times, hereinafter be referred to as combustion chambers.

Main intake passages 17 are formed in one side of the cylinder head 15 and terminate at main intake ports 18 which communicate with the respective chambers 16. Intake valves 19 control the flow through the main intake passages 17 and are operated in any known manner, as by means of an overhead mounted camshaft (not shown). The side of the cylinder head 15 opposite to the main intake passages 17 is formed with exhaust passages 21 which extend from each chamber 16 to an exhaust manifold, indicated generally at 22. Exhaust valves 23, which are also operated by means of an overhead camshaft (not shown) control the communication between the chamber 16 and the exhaust passages 21.

The engine as thus far described is conventional and, for that reason, a more detailed description is not believed to be necessary. The invention finds its place in the fuel injection system and induction system, now to be described. The induction system includes an air inlet 24 in which an air flow detector 25 is provided. The air flow detector 25 rotates to a position dependent on the air flow through the inlet 24 and controls the amount of fuel discharged, as will become apparent. The inlet 24 is connected by means of a flexible conduit 26 to an intake casting 27 of an intake manifold, indicated generally by the reference numeral 28. The intake casting 27 has an air inlet 29 in which a manually operated throttle valve 31 is supported for rotation upon a throttle valve shaft 32. Downstream of the manually operated throttle valve 31, a control valve 33 is supported upon a control valve shaft 34. The control valve 33 is operated automatically, in a manner to be described.

The passage 29 discharges into a plenum chamber 35 of the intake manifold 28. Runners 36 extend from the plenum 35 to the individual main cylinder head intake passages 17 so that a charge will be delivered from the induction system to the respective chambers 16.

In order to permit the induction of a charge to the chamber 16 at high velocity under low load conditions, an auxiliary induction system is also provided. The auxiliary induction system includes an inlet 37 that is formed in the manifold casting 27 and is in registry with the passage 29 between the throttle valve 31 and the control valve 33. The inlet 37 is connected with a vertically extending passage 38 which, in turn, communicates with a horizontally extending passage 39 which terminates at a transverse distribution passage 41.

Auxiliary intake runners 42 are formed in the cylinder head 15 for each chamber 16. The runners 42 extend from the transverse passage 41 through the cylinder head 15 and terminate in auxiliary intake ports 43 that are juxtaposed to the heads of the intake valves 19 and the main intake ports 18. The effective cross sectional area of the auxiliary induction system, which has been described, is substantially less than that of the main induction system so that a given mass flow of charge entering the chambers 16 through the auxiliary induction system will pass at a significantly higher velocity. The close proximity between the ports 18 and 43 insures that substantially none of this velocity will be dissipated upon induction into the chamber 16.

The control valve 33 is operated in a manner so that substantially all of the idle and low speed charge requirements of the chamber 16 will be provided through the auxiliary induction system. As load on the engine increases, an increasing proportion of the charge will be supplied through the main induction system. In order to achieve this result, the control valve 33 is operated by means of a vacuum actuator, indicated generally by the reference numeral 44. The vacuum actuator 44 includes an outer housing 45 in which a flexible diaphragm 46 is positioned. The diaphragm 46 divides the housing 45 into an atmospheric chamber 47 and a vacuum chamber 48. The chamber 47 is vented to atmospheric pressure by an atmospheric vent (not shown) or by means of a clearance between the housing 45 and a link 49 that is connected to the diaphragm 46. The opposite end of the link 49 is pivotly connected to a lever 51 that is affixed to the control valve shaft 34 for rotatably positioning the control valve 33. The chamber 48 is exposed to induction system pressure by means of a conduit 52 that interconnects the chamber 48 with a vacuum port 53 formed in the manifold casting 27. A spring 54 is positioned in the vacuum chamber 48 so as to normally urge the control valve 33 toward a fully opened position.

A charge is formed for the chambers 16 by means of a pair of fuel injection nozzles 54 and 55. The nozzle 54 is supported in the casting 27 upstream of the manually operated throttle valve 31. In a similar manner, the nozzle 55 is supported in the casing 27 and discharges into the passage 29 between the manually operated throttle valve 31 and the control valve 33. It should be noted from an inspection of FIG. 2 that the nozzles 54 and 55 are disposed on one side of the passage 29, this being the side on which the upstream peripheral edges of the throttle and control valves 31, 33 lie. Furthermore, the nozzles 54 and 55 are directed so that the centerline of their discharge intersects the respective shaft 31, 34 in a generally perpendicular direction. It should be readily apparent from an inspection of this figure that the nozzles 54 and 55 will discharge against the body of the respective valve 31, 33 throughout the full angular position of the respective valve. Thus, the likelihood of fuel issuing a high pressure from the nozzles 54, 55 striking on the wall which defines the passage 29 will be substantially minimized. Thus, any fuel which might be deposited upon the respective valve 31, 33 will be reintroduced into the air flow particularly due to the fact that the air passes with a relatively high velocity across each respective valve surface, regardless of the engine speed.

It should also be noted that both valves 31 and 33 are inclined downwardly so that any fuel deposited upon them from the nozzles 54 and 55 will be directed toward the auxiliary induction system 37. Thus, any such liquid fuel will tend to be drawn into the auxiliary induction system where the air is flowing at high velocity due to the relatively small cross sectional area. Thus, vaporization of any such liquid fuel will be insured prior to induction into the chambers 16.

FIGS. 1 and 2 illustrate the engine running in its idle condition. In this condition, the throttle valve 31 will be fully closed as shown by the solid line view in FIG. 2. It should be noted that the throttle valve 31 is slightly smaller in diameter than the passage 29. The clearance there between serves to provide the idle air flow. If desired, an additional bypass passage 56 may also be provided around the idle position of the throttle valve 51. The amount of bypass idle air is controlled by an adjustable needle valve 57. When the engine is idling, there will be a substantially high induction system vacuum which is transmitted from the port 53 through the conduit 52 to the chamber 48. The atmospheric pressure acting in the chamber 47 will, therefore, cause the diaphragm 46 to move to the left and compress the spring 54. This causes the control valve 33 to be moved to its fully closed position. Thus, all idle air flow will be delivered to the chambers 16 through the auxiliary induction system.

In order to improve fuel control, the nozzles 54, 55 are arranged so as to fire alternately. That is, the nozzle 54 will discharge during the induction cycle of one chamber 16 and the nozzle 55 will be fired during the induction cycle of the next chamber in sequence. Thus, each nozzle need only serve half the requirements of the complete engine. The amount of fuel delivered to the nozzles 54 and 55 is controlled as previously noted by the angular position of the air flow detector 25 by means of any known type of control device.

As the load on the engine is increased or as the speed is increased, the manually operated throttle valve 31 will be progressively opened. As the valve 31 continues to open and load and/or speed increases, the induction system vacuum will fall. Eventually a point will be reached when the atmospheric pressure in the chamber 47 is no longer sufficient so as to maintain the control valve 33 in its closed position. When this occurs the spring 54 will cause the control valve 33 to begin to open and an increasing proportion of the charge requirements for the engine will be delivered through the main induction system.

In order to further improve fuel vaporization under low temperature conditions, a hot spot 58 is provided in the manifold 28 underneath the auxiliary induction system passage 39. Engine coolant is supplied to the hot spot 58 to heat the charge flowing through the auxiliary induction system, when desired.

Figure 3:
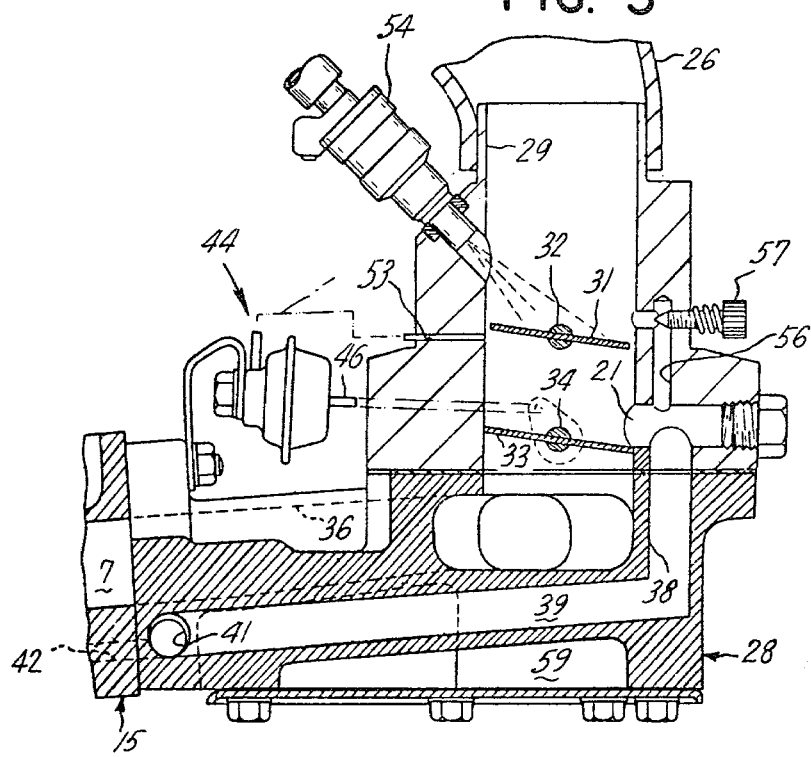
FIG. 3 is a partial cross sectional view, in part similar to FIG. 2, showing another embodiment of the invention.
Figure 4:
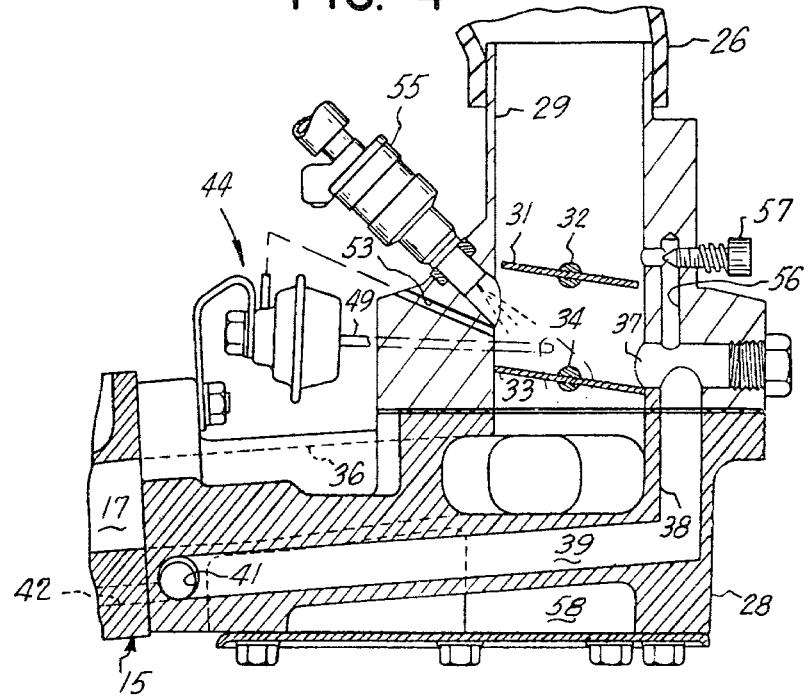
FIG. 4 is a partial cross sectional view, in part similar to FIGS. 2 and 3 showing a third embodiment of the invention.

In the embodiment of FIGS. 1 and 2, two alternately firing fuel injection nozzles were provided. In connection with that embodiment, one nozzle was disposed adjacent the manually positioned throttle valve and the other was positioned adjacent the automatically positioned control valve. It is to be understood that the invention is susceptible to use in engines having only one fuel injection nozzle for multiple cylinders. In conjunction with such an arrangement the single nozzle may be positioned as the nozzle 54 adjacent the manually positioned throttle valve 31 as shown in FIG. 3 or as the single nozzle 55 adjacent the automatically positioned control valve 33 as shown in FIG. 4.

Figure 5:
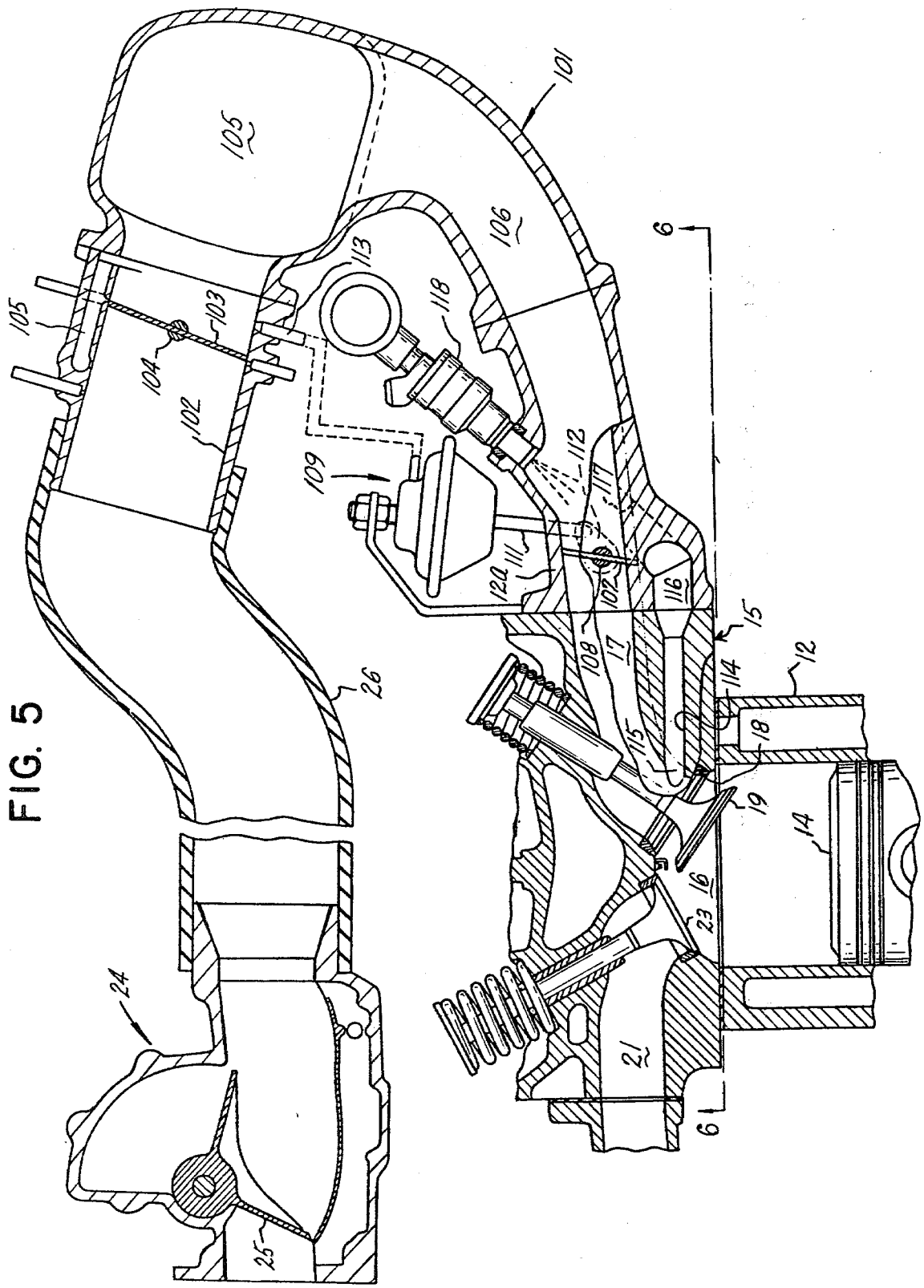
FIG. 5 is a cross sectional view, in part similar to FIG. 2, showing a still further embodiment of the invention.

The invention is also susceptible of application to engines in which a single fuel injection nozzle is provided for each chamber of the engine. Such an arrangement is shown in FIGS. 5 and 6 where, as has been previously noted, portions of the engine which are the same and function the same as in earlier described embodiments have been identified by the same reference numerals and will not be described again.

In conjunction with this embodiment, the primary difference between it and the previously described embodiments is in the intake manifold and fuel injection system. The control device 25 for the injection system is, however, the same in configuration and operation of the previously described embodiments. The associated controls, however, must be such so as to accommodate the fact that separate nozzles are provided for each chamber 18, as will become apparent.

The intake manifold of this embodiment is identified generally by the reference numeral 101 and includes an intake 102 to which air is delivered by the flexible conduit 28. A single manually positioned throttle valve 102 is supported in the inlet 102 on a shaft 104. As with the previously described embodiment, an idle air bypass 105 may be provided around the throttle valve 103 so as to introduce additional idle air flow.

Downstream of the throttle valve 103, the manifold 101 is provided with a plenum chamber 105. Runners 106 extend from the plenum 105 to each of the cylinder head intake passages 17. In accordance with this embodiment, a control valve 107 is positioned in each main intake runner 106. The control valves 107 are all affixed to a common shaft 108 and the position of the control valves 107 is controlled by a vacuum actuator 109 having an actuating rod 111 which is connected to the shaft 108 by means of a lever 112. The actuator 109 is operated by induction system vacuum, as in the previously described embodiment and a vacuum port 113 is provided for this purpose.

An auxiliary intake passage 114 is provided in the cylinder head 15 for each chamber 16. The cylinder head passages 114 terminate in auxiliary intake ports 115. As with the previously described embodiments, the ports 115 are juxtaposed to the main intake ports 18 of the cylinder head 15.

Each auxiliary intake passage 114 is formed with an enlarged mouth 116 formed in both the cylinder head 15 and intake manifold 101. Each mouth 116 is served by an inlet 117 that opens into the main intake runners 106 upstream of the control valves 107.

The auxiliary induction passages consisting of the inlet 117, mouth 116, passages 114 and ports 115 have an effective cross sectional area substantially less than that of the main induction passage for the reasons aforedescribed.

Disposed on the side of the runners 106 opposite to the auxiliary induction system inlets 117 are fuel injection nozzles 118, there being such a nozzle for each chamber 16. The nozzles 118 are dispositioned so that they will inject into the runners 106 toward the upstream closed edge of the throttle valves 107 and also into the auxiliary induction system inlets 117. In this way, condensation or the deposition of liquid fuel on the manifold passages will be eliminated. In all other regards this embodiment operates the same as the previously described embodiments and for that reason a detailed description of its operation will not be given.

It should be readily apparent that a number of embodiments of the invention have been described and each of which permits the use of fuel injection while minimizing low speed running problems, particularly those associated with the deposition of liquid fuel on the induction tract. Furthermore, in certain embodiments the cost of the system is reduced through the use of one fuel injection nozzle for a plurality of chambers. This is done in such a way that manifold wetting and unequal distribution is avoided even though the nozzle is at a considerable distance from the various chambers which it serves. Furthermore, the concept of providing alternately firing fuel nozzles has also been disclosed. Even though several embodiments of the invention have been illustrated and described, it is believed to be readily apparent that this invention is susceptible of use in still further embodiments without departing from the spirit and scope of the invention as defined by the appended claims.

What is claimed is:

1. In an internal combustion engine having a variable volume chamber in which combustion ocurs, a main intake port, a main intake passage communicating with said chamber through said main intake port for delivering a charge thereto, an auxiliary intake port, an auxiliary intake passage inlet, and an auxiliary intake passage communicating said auxiliary intake passage inlet with said chamber through said auxiliary intake port, said auxiliary intake passage having an effective cross sectional area substantially less than the effective cross sectional area of said main intake passage for causing a given mass flow of charge through the said auxiliary intake port to enter said chamber at a substantially greater velocity, and valve means for controlling the ratio of communication of said ports with said chamber during a given cycle of operation of said engine, said auxiliary passage inlet being in communication with said main intake passage, the improvement comprising a fuel injection nozzle discharging into said main intake passage and means for directing the outlet spray from said fuel injection nozzle in a direction where the major portion of the spray therefrom is directed toward said auxiliary intake passage inlet.

2. An internal combustion engine as described in claim 1 wherein the fuel injection nozzle is positioned on one side of the main intake passage and the auxiliary intake passage inlet is disposed on the opposite side of said main intake passage.

3. An internal combustion engine as described in claim 1 wherein the means for directing the outlet spray from the fuel injection nozzle comprises having said fuel injection nozzle disposed to discharge directly toward the auxiliary intake passage inlet.

4. An internal combustion engine as described in claim 1 wherein the valve means includes at least one butterfly type throttle valve positioned in the main intake passage, said fuel injection nozzle being disposed on the upstream side and adjacent the peripheral edge of said butterfly type throttle valve.

5. An internal combustion engine as described in claim 4 wherein the auxiliary intake passage inlet is disposed contiguous to the peripheral edge of the downstream side of the butterfly type throttle valve when the throttle valve is in its closed position so that said throttle valve acts as the means for directing the fuel injection nozzle spray.

6. An internal combustion engine as described in claim 5 wherein the fuel injection nozzle discharges in a substantially perpendicular direction relative to the butterfly type throttle valve.

7. In an internal combustion engine having a variable volume chamber in which combustion occurs, a main intake port, and a main intake passage communicating with said chamber through said main intake port for delivering a charge thereto, an auxiliary intake port, an auxiliary intake passage communicating with said chamber through said auxiliary intake port, said auxiliary intake passage having an effective cross sectional area substantially less than the effective cross sectional area of said main intake passage for causing a given mass flow of charge through said auxiliary port to enter said chamber at a substantialy greater velocity, and throttle valve means for controlling the ratio of communication of said ports with said chamber during a given cycle of operation of said engine, the improvement comprising said throttle valve means including a butterfly type throttle valve rotatably positioned in one of said intake passages and a fuel injection nozzle discharging into said one induction passage in a direction to impinge upon said butterfly type throttle valve in at least certain of the positions of said throttle valve before fuel from said fuel injection nozzle can impinge upon a wall of the intake passage in which said throttle valve is positioned.

8. An internal combustion engine as described in claim 7 wherein the fuel injection nozzle spray impinges on the butterfly type throttle valve at all positions of said throttle valve.

9. An internal combustion engine as described in claim 7 wherein the fuel injection nozzle is disposed adjacent the upstream peripheral edge of the throttle valve when the said throttle valve is in its closed position.

10. An internal combustion engine as described in claim 9 wherein the fuel injection nozzle discharges in a substantially perpendicular direction relative to the butterfly type throttle valve.

11. In internal combustion engine as described in claim 7 wherein the throttle valve is supported for rotation upon a throttle valve shaft, the spray from the fuel injection nozzle being directed at said throttle valve shaft.

12. An internal combustion engine as described in claim 11 wherein the fuel injection nozzle discharges in a substantially perpendicular direction relative to the butterfly type throttle valve.

13. An internal combustion engine as described in claim 7, 8 or 9, wherein the butterfly type throttle valve is positioned in the main intake passage.

14. An internal combustion engine as described in claim 13 wherein the auxiliary intake passage has its inlet in communication with the main intake passage contiguous to the downstream peripheral edge of the throttle valve when the throttle valve is in its closed position.

15. An interal combustion engine as described in claim 14 wherein the auxiliary intake passage inlet is disposed on the upstream side of the throttle valve when the throttle valve is in its closed position.

16. An internal combustion engine as described in claim 15 wherein the auxiliary intake passage inlet is disposed on the downstream side of the throttle valve when the throttle valve is in its open position.

17. An induction system for at least two variable volume chambers of an internal combustion chamber in which combustion occurs, said induction system comprising a pair of induction passages each serving a respective one of said chambers for delivering a charge thereto, an air intake for receiving an air charge, each of said induction passages in communication with said air intake for receiving a charge therefrom and delivering it to the respective of said chambers, a pair of fuel injection nozzles each of which discharge into said air intake one upstream of the other, and means for alternately causing first one of said nozzles to discharge fuel and then the other of said nozzles to discharge fuel so that the discharge of fuel from said nozzles is not coextentive and the discharge of each nozzle serves a chamber other than the other nozzle.

18. An induction system as set forth in claim 17 wherein there are a number of chambers which are a multiple of the number of fuel injection nozzles so that each nozzle serves a plurality of chambers different from the chambers served by the other of said nozzles.

19. An induction system as set forth in claim 17 or 18 further including a first throttle valve in the air intake, one of the fuel injection nozzles being positioned upstream of said first throttle valve and the other of the fuel injection nozzles being downstream of said first throttle valve.

20. An induction system as set forth in claim 19 wherein there is a second throttle valve in the air intake downstream of the first throttle valve and downstream of both of the fuel injection nozzles.

21. An induction system as set forth in claim 20 further including an auxiliary induction system for serving each of the chambers, said auxiliary induction system having an auxiliary induction system inlet in communication with the air intake between the first and second throttle valves and a plurality of runners each terminating at an auxiliary intake port, each of said auxiliary intake ports communicating with a respective of said chambers.

22. An induction system as set forth in claim 21 wherein the effective cross-sectional area of the auxiliary intake system being substantially less than that of the induction passage for delivery of a charge therethrough to the respective chambers at a significantly greater velocity.

* * * * *